United States Patent
Ichihara et al.

(10) Patent No.: US 7,641,783 B2
(45) Date of Patent: Jan. 5, 2010

(54) PLATING SOLUTION, PROCESS FOR PRODUCING A STRUCTURE WITH THE PLATING SOLUTION, AND APPARATUS EMPLOYING THE PLATING SOLUTION

(75) Inventors: Shigeru Ichihara, Tokyo (JP); Tohru Den, Tokyo (JP); Nobuhiro Yasui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 10/566,949

(22) PCT Filed: Jan. 14, 2005

(86) PCT No.: PCT/JP2005/000732

§ 371 (c)(1),
(2), (4) Date: Feb. 3, 2006

(87) PCT Pub. No.: WO2005/068688

PCT Pub. Date: Jul. 28, 2005

(65) Prior Publication Data

US 2006/0254924 A1    Nov. 16, 2006

(30) Foreign Application Priority Data

Jan. 16, 2004  (JP) ............................... 2004-009238
Sep. 17, 2004  (JP) ............................... 2004-271466

(51) Int. Cl.
*C25D 3/56*  (2006.01)
*C25D 3/52*  (2006.01)
*G11B 5/858*  (2006.01)
*H01F 10/14*  (2006.01)

(52) U.S. Cl. ............... 205/242; 205/119; 205/173; 205/257; 205/259

(58) Field of Classification Search ............... 205/242, 205/257

See application file for complete search history.

(56) References Cited

U.S. PATENT DOCUMENTS 2,945,217 A   7/1960  Fisher et al. ............... 340/174
3,031,386 A   4/1962  Tsu et al. ..................... 204/43

(Continued)

FOREIGN PATENT DOCUMENTS

CH    393 026    10/1965

(Continued)

OTHER PUBLICATIONS

Robert C. Weast, editor, Handbook of Chemistry and Physics, 57th edition, CRC Press, Cleveland, Ohio, 1976, pp. D143-D145.*

(Continued)

*Primary Examiner*—Patrick Ryan
*Assistant Examiner*—William T Leader
(74) *Attorney, Agent, or Firm*—Fitzpatrick, Cella, Harper & Scinto

(57) ABSTRACT

A stable FePt plating solution is provided. Further, a process for electroplating is provided for producing an FePt magnetic material having an especially strong coercive force and excellent properties by using the plating solution. The plating solution contains ionic Fe, ionic Pt, and a complex agent, at a molar ratio (Fe/Pt) of the ionic Fe to the ionic Pt ranging from 0.75 to 3.

8 Claims, 2 Drawing Sheets

U.S. PATENT DOCUMENTS

| | | | |
|---|---|---|---|
| 3,032,485 A | 5/1962 | Tsu et al. | 204/43 |
| 3,032,486 A | 5/1962 | Sallo et al. | 204/43 |
| 5,102,509 A * | 4/1992 | Albon et al. | 205/257 |
| 5,156,729 A * | 10/1992 | Mahrus et al. | 205/104 |
| 5,435,898 A * | 7/1995 | Commander et al. | 205/245 |
| 7,070,855 B2 | 7/2006 | Fukutani et al. | 428/312.2 |
| 7,074,480 B2 | 7/2006 | Fukutani et al. | 428/312.2 |
| 7,081,303 B2 | 7/2006 | Yasui et al. | 428/446 |
| 2004/0074336 A1* | 4/2004 | Daimon et al. | 75/365 |
| 2005/0211663 A1 | 9/2005 | Imada et al. | |

FOREIGN PATENT DOCUMENTS

| | | |
|---|---|---|
| JP | 10-212592 | 8/1998 |
| JP | 10-212592 A * | 11/1998 |
| JP | 11-200090 | 7/1999 |
| JP | 2002-180259 | 6/2002 |
| JP | 2004-237431 | 8/2004 |
| JP | 2004-323948 | 11/2004 |

OTHER PUBLICATIONS

Fernando M.F. Rhen et al., "Electrodeposited FePt Films," 39(5) *IEEE Trans. Mag.* 2699-2701 (Sep. 2003).

Fernando M.F. Rhen et al., "Electrodeposited FePt Films," The 2003 IEEE International Magnetics Conference, FQ-06.

* cited by examiner

PLATING SOLUTION, PROCESS FOR PRODUCING A STRUCTURE WITH THE PLATING SOLUTION, AND APPARATUS EMPLOYING THE PLATING SOLUTION

TECHNICAL FIELD

The present invention relates to a plating solution, a process for producing a structure with the plating solution, and an apparatus employing the plating solution.

BACKGROUND ART

A recording density of a hard disk (HDD), a main recording assembly of a personal computer, is being increased at a remarkable rate, 100-fold or more in 10 years. In recent years, HDDs are being developed not only for personal computers, but also for digital household electric appliances and portable information stations, so that a further increase in recording density is wanted for these uses.

At the moment, conventional HDDs employ longitudinal recording systems in which magnetization is kept in the direction of the disk plane. In the longitudinal recording system, the magnetic recording layer should be made thinner to suppress diamagnetism in the magnetic domains and to form a strong magnetic field above the medium. The individual magnetic particles in the magnetic layer constituting the thinner magnetic recording layer are smaller in size, and magnetic energy held by the smaller magnetic particles is affected significantly by thermal energy. Consequently, the effect of superparamagnetism (thermal fluctuation) becomes remarkable, which causes a loss of the recorded magnetization.

On the other hand, in the vertical recording system in which the magnetization is kept in a direction perpendicular to the disk plane, with the increase of the recording density, demagnetization is decreased and the magnetization is stabilized in principle, being different from the longitudinal recording system, and the superparamagnetism would be less liable to occur. Therefore, the vertical magnetic recording system is attracting attention as a technique for increasing the density of the magnetic recording.

At present, CoCr alloys are mainly studied as the material of the recording layer of the vertical magnetic recording medium. For more effective suppression of the superparamagnetism, FePt alloys are attracting attention, which alloys have an L10 ordered alloy structure and which are capable of generating a strong anisotropic magnetic field of $7 \times 10^7$ erg.cm$^{-3}$ and of achieving a greater coercive force, as a new-generation recording film material.

For production of the FePt alloy, many investigations are conducted regarding a vapor-quenching process, such as sputtering, and vapor deposition. In the FePt alloy production by the vapor-quenching process, an fcc phase as an irregular phase is formed first, and is then transformed into an L10 structure with crystal grain growth by a high temperature treatment at 600° C. or higher. However, for lower noise in the magnetic recording medium, the crystal grains should be made finer. Further, the high temperature treatment in the magnetic recording medium production process is not suitable because of undesired melting of the substrate and other disadvantages.

For formation of an ordered phase of an L10 structure of FePt by a heat treatment below 600° C., the following methods are disclosed: a method of alternate lamination of monoatomic layers of Fe and Pt (001) by molecular beam epitaxy (MBE) or the like process to prepare an FePt magnetic material having a strong coercive force, and a method of production of an FePt magnetic material having a coercive force of about 5000 Oe by adding a third element, such as Cu and Ag.

As another process, a liquid phase process of electrolytic plating is disclosed for the FePt magnetic material production. The electrolytic plating process, which does not use an expensive vacuum apparatus, such as a sputtering apparatus and a vapor deposition apparatus, is suitable for industrial mass production (Japanese Patent Application Laid-Open No. 2002-180259).

A production process for an FePt magnetic material by electrolytic plating is disclosed in which an FePt electric deposition film is produced from iron sulfate and hexachloroplatinate(IV) salt (intermag 2003 "electrodeposited FePt film").

However, in the conventional plating solution, the ionic Fe and the ionic Pt are unstable, tending to form more stable precipitates. Thereby, the intended FePt is not readily obtainable. A stable plating solution is wanted for the FePt plating.

With the above background, the present invention provides a plating solution for FePt plating.

The present invention also provides a process for producing a structure by use of the plating solution for FePt plating.

The present invention further provides an apparatus, which employs the plating solution for FePt plating.

The aforementioned problems are solved by the means described below.

According to an aspect of the present invention, there is provided a plating solution, which contains ionic Fe, ionic Pt, and a complex agent, at a molar ratio of the ionic Fe to the ionic Pt ranging from 0.75 to 3.

The complex agent preferably contains tartrate ions or citrate ions.

The concentration of the ionic Fe preferably ranges from 0.005 mol/L to 0.1 mol/L.

The plating solution preferably has a pH ranging from 5.0 to 10.5.

The ionic Fe and the ionic Pt preferably form a double complex constituted of an Fe complex and a Pt complex.

The plating solution preferably contains ionic Cu and a complex agent for the ionic Cu.

According to another aspect of the present invention, there is provided a process for producing a structure comprising steps of:

providing an electrode and an object to be plated in a vessel containing the plating solution, and plating the object with a magnetic material containing FePt from the plating solution by applying voltage to the electrode to form a structure.

The structure formed in the process is preferably heat-treated further at a temperature ranging from 450° C. to 750° C.

The structure in the process is preferably heat-treated further in the presence of hydrogen.

The object to be plated in the process is preferably a structure having holes, and the step of plating the object to form the structure is deposition of the magnetic material containing FePt into the holes. According to still another aspect of the present invention, there is provided an apparatus, having the plating solution, a vessel for holding the plating solution, and electrodes, for conducting plating by application of a voltage to the electrodes.

According to the present invention, the plating solution for FePt plating is stabilized by adjusting the molar concentration ratio of the ionic Fe to the ionic Pt within the range from 0.75 to 3 in the plating solution (the ratio is referred to occasionally as a "FePt ratio"). The use of this plating solution enables formation of an FePt plating layer having a strong coercive force. A structure having holes filled with the FePt is useful for forming a magnetic recording medium for high-density recording.

BEST MODE FOR CARRYING OUT THE INVENTION

Figure 1:
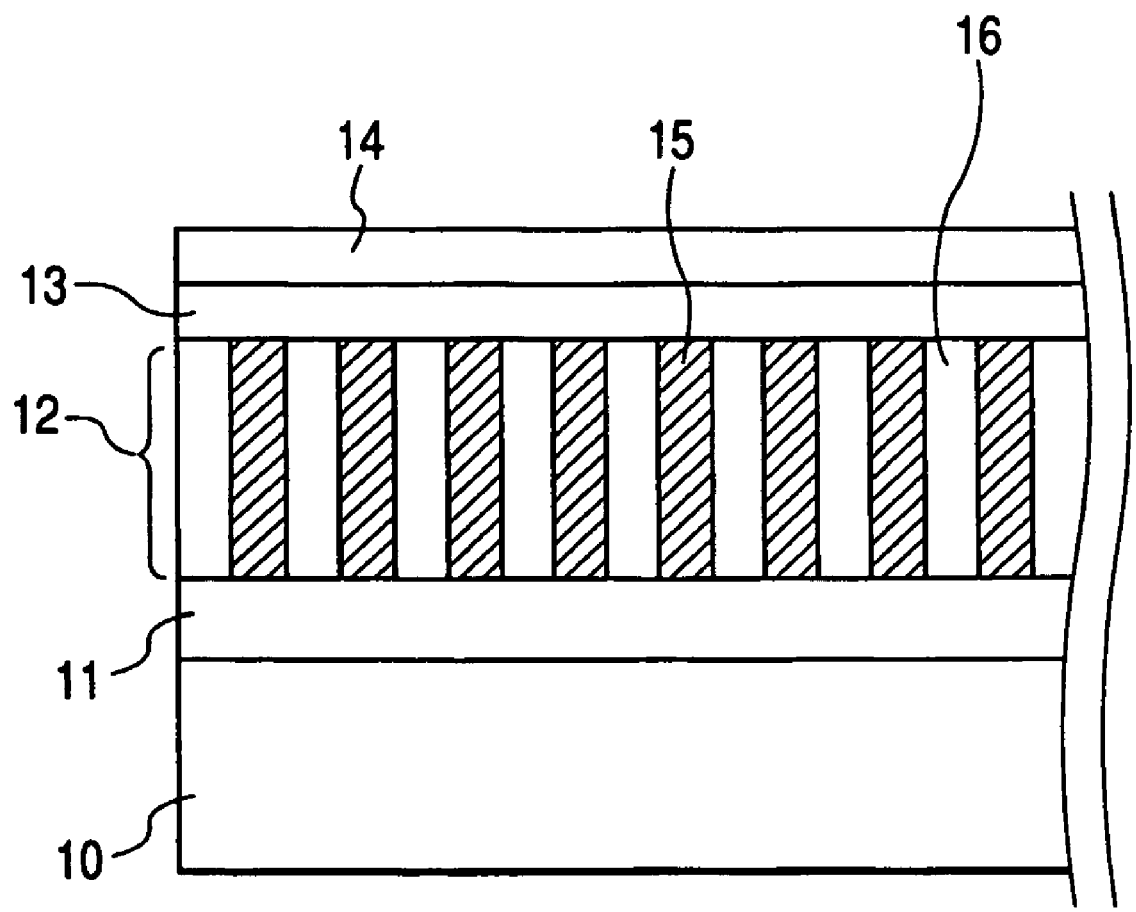
FIG. 1 is a schematic drawing of an example of an embodiment of a magnetic recording medium employing a magnetic material produced by the present invention.

The mode for carrying out the present invention is explained below.

An FePt alloy having an L10 ordered alloy phase contains Fe at a composition ratio of about 50 at. %. In the present invention, however, the FePt magnetic material is not limited to alloys containing Fe—Pt at a composition ratio of 1:1. The FePt magnetic material in the present invention includes FePt alloys containing Fe at a content ranging from 40 at. % to 60 at. %.

The FePt magnetic material in the present invention is formed from a plating solution containing Fe and Pt metallic ions and additionally a complex agent capable of stabilizing the metal ions in the solution.

Usually, the ionic Fe in the Fe ion-containing plating solution is fed as bivalent ions to an aqueous source solution. In the present invention, ferrous sulfate and ferrous chloride are useful as the source material of the bivalent ionic Fe in the plating solution, but another bivalent ionic Fe compound may be used as the source material.

The bivalent ionic Fe is readily oxidized to be tervalent, and this tervalent ionic Fe reacts with hydroxide ions to form an $Fe(OH)^3$ precipitate. That is, the plating solution containing ionic Fe is unstable and tends to form a precipitate. The formation of the precipitate can be prevented by complexing the ionic metal for stabilization in the solution. However, the addition of the complex agent should be carefully investigated, since the reduction potential of the ionic metal is different from that of the metal complex, and the addition of a complex agent can prevent deposition of the metal. Further, an impurity contained in the complex agent may become included in the formed film. Furthermore, stability of the metal complex to the temperature and pH of the bath should be taken into account. The FePt magnetic material of the present invention should contain the Fe at a content around 50 at. % to form the L10 ordered alloy phase. Therefore, the complex agent should be selected to be controllable to obtain the above composition. The complex agent may be the one that is capable of forming a complex containing plural kinds of ionic metals, such as a complex agent capable of forming a double complex composed of an Fe complex and a Pt complex formed from ionic Fe and ionic Pt.

The complex agent to be added to the plating solution includes tartaric acid, citric acid, succinic acid, malonic acid, malic acid, and gluconic acid and salts thereof. The inventors of the present invention have found that a complex agent is particularly effective, which agent contains at least one compound selected from the group consisting of tartaric acid and salts thereof, citric acid and salts thereof. Sodium tartrate and ammonium tartrate are especially preferred. For instance, sodium tartrate or ammonium tartrate added to ionic Fe is considered to react with the ionic Fe to form iron tartrate. In a plating solution containing hexachloroplatinate(IV) as an ionic Pt material, the iron tartrate bonds to the hexachloroplatinate(IV) to stabilize, which is shown by analysis by ESI-MS (electrospray ionization mass spectroscopy). This ESI-MS is an analysis method in which a liquid flow from liquid chromatogram (LC) is ejected from a capillary into an atmospheric pressure under the application of a high voltage for ionization and the components of the ions are analyzed by mass spectroscopy.

When a complex agent for supplying tartrate ions is selected and is added to the plating solution, the bivalent Fe ions and the tartrate ions form iron tartrate. The concentrations of the tartrate ions and the concentration of the Fe ions are preferably equivalent.

An excess of the iron tartrate is unstable in the plating solution and forms a precipitate. For dissolution of the iron tartrate in the solvent water, the concentration of ionic Fe in the plating solution should be not higher than 0.1 mol/L, preferably not higher than 0.05 mol/L. At the Fe ion concentration of not higher than 0.05 mol/L, the plating solution is highly stable, whereas at an extremely low Fe ion concentration, allowable ranges of conditions in the plating process are narrow to lower the reproducibility of the FePt composition ratio. Therefore, the Fe ion concentration is preferably not less than 0.005 mol/L.

As the source material for the ionic Pt, a hexachloroplatinate(IV) salt is useful in the present invention. The hexachloroplatinate(IV) salt is known to change by substitution of the chloride ions coordinating to the Pt atom by $H_2O$ and —OH under the influence of the pH or other conditions during a period of time. The inventors of the present invention discovered that the presence of excess chloride ions is preferred in the plating solution for stabilization of the hexachloroplatinate(IV) in the plating solution of the present invention. The chloride ion concentration should be not lower than the molar concentration equivalent to the hexachloroplatinate(IV) salt. The presence of the excess quantity of the chloride ions is desirable for stabilization of the plating solution. The chloride ions are preferably present in an amount of up to 15 times the quantity equivalent to the Pt in consideration of the properties of the formed FePt film.

In controlling the content of Fe in the FePt magnetic material to be at about 50 at. %, the composition ratio of the magnetic material depends largely on the ratio of the source compounds in the plating solution and the set potential in the plating. Variation of the potential causes variation of the current density per area of the working electrode, and the current density affects the composition ratio. The stirring condition and the temperature also affect the composition ratio. Further, the potential actually causing the reduction reaction is affected by the electrode and the solvent. Therefore, a potential more negative than the reduction potential of the metal, namely an overvoltage, should be applied. However, excessive negative overvoltage will cause the generation of hydrogen by reduction of hydrogen ions on the working electrode to affect the electrodeposition rate and to deteriorate the quality of the plated film. Therefore, the potential should be set suitably.

For production of an intended FePt magnetic material with high reproducibility under the above-mentioned conditions from a stable plating solution, it has been found in the present invention that the ratio of Fe to Pt in the plating solution is preferably in the range from 0.75 to 3. At the ratio Fe/Pt<0.75, the intended FePt alloy of 50 at.% Fe is not obtained, whereas at the ratio Fe/Pt>3, the plating solution is unstable, being liable to cause precipitation.

Further, in view of the solubility of iron tartrate, the stability of the formed FePt thin film, and other problems, the Fe ion concentration should be in the range from 0.005 mol/L to 0.1 mol/L. The range from 0.01 mol/L to 0.05 mol/L is particularly preferred in the present invention.

The properties of the electroplated FePt magnetic material, such as appearance, stress and other physical properties, and magnetic properties depend on the composition, particle size, orientation, and other properties of the deposited FePt, which are determined by the plating solution conditions, plating conditions, and various factors.

The plating solution of the present invention becomes unstable at the pH of the solution lower than 5.0 and at the pH higher than 10.5. Therefore, the pH of the plating solution is preferably in the range from pH 5.0 to pH 10.5, more preferably from pH 7 to pH 9. Any pH controlling agent may be used without limitation. However, an excessive quantity of ammonia may cause precipitation of ammonium hexachloroplatinate(IV) by a reaction of the hexachloroplatinate(IV) salt and the ammonia. Therefore, use of sodium hydroxide or the like is preferred for the pH adjustment to avoid excess ammonium ions.

The above plating solution may contain an additive, such as a supporting electrolyte like sodium sulfate, a buffering agent like ammonium chloride, and a surfactant like sodium dodecylsulfate.

The temperature of the plating solution is in the range preferably from 15° C. to 70° C., more preferably from 25° C. to 50° C. At a higher bath temperature, the bath is unstable, resulting in precipitation and other disadvantages. Since the amount of Pt electrodeposition increases with elevation of the bath temperature, the potential and the Fe/Pt ratio should be controlled corresponding to the bath temperature.

From the above FePt plating solution, an FePt magnetic material can be prepared, which contains Fe at a content of 40 to 60 at. %. The FePt composition can be determined by X-ray fluorometry (XRF) and high frequency-induced plasma coupling analysis (ICP), or the like method.

The FePt magnetic material produced as above, immediately after the plating, is an alloy having an fcc phase not having a high coercivity (Hc) for a magnetic recording material. The transformation from the formed magnetic material to an L10 structure is initiated by a heat treatment at 400° C. A heat treatment at 450° C. or higher provides a coercive force of 4000 Oe or more to the magnetic material. The heat treatment temperature is preferably in the range from 450° C. to 750° C.

Heat treatment of the formed magnetic material in the presence of hydrogen at 350° C. or higher makes the material transform into the L10 structure to have a coercive force exceeding 4000 Oe.

The underlayer under the plated FePt film should have electroconductivity. Further the underlayer is preferably a thin film or films of Ag and/or Cu for forming an ordered structure of the FePt magnetic material by diffusion during the heat treatment.

At the Fe content of higher than 60 at. % or lower than 40 at. %, the intended FePt magnetic material of strong coercive force cannot be obtained by the heat treatment. The FePt magnetic material may contain a trace amount of hydrogen or carbon as an impurity. However, a larger impurity amount deteriorates the properties of a magnetic recording material employing the FePt magnetic body. Therefore, the impurity content is preferably lower.

Next, a magnetic recording medium, which has holes of 100 nm or less in diameter filled with an FePt magnetic material of the present invention, will be described.

FIG. 1 illustrates schematically a constitution of a magnetic recording medium, which has fine holes filled with an FePt magnetic material of the present invention.

In FIG. 1, the numerals denote the following: 10, a substrate; 11, an underlying electrode layer; 12, a recording layer; 13, a protection layer; 14, a lubrication layer; 15, a magnetic material; and 16, a recording layer base.

Substrate 10 is a flat plate made of glass, quartz, silicon, or the like.

Figure 2A:
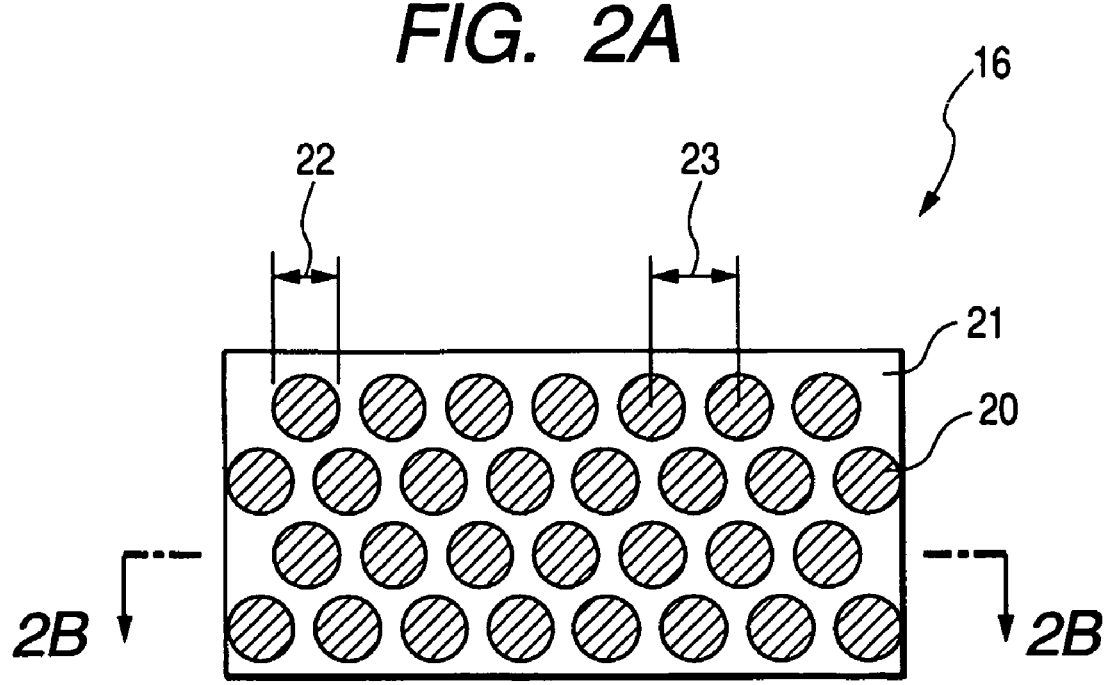
FIGS. 2A and 2B are schematic drawings of a structure having fine holes.
Figure 2B:
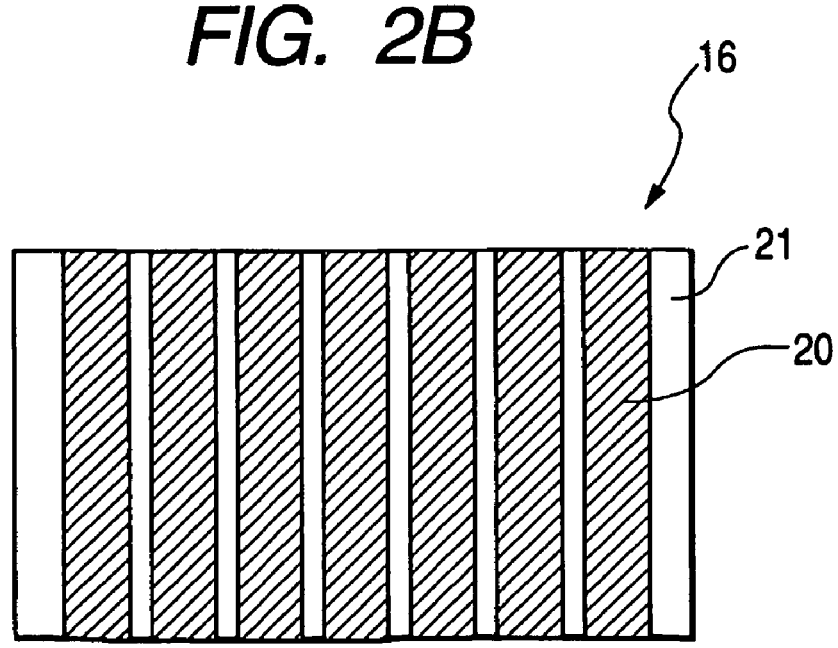

Recording layer 12 is constituted of recording layer base 16 having fine holes filled with magnetic material 15 of the present invention, as shown, for example, in FIGS. 2A and 2B. In this embodiment, the filled magnetic material is an L10 ordered alloy, and the c-axis thereof is oriented preferably to be perpendicular to the substrate.

Recording layer base 16, as shown in FIG. 2A, has fine holes 20 partitioned by base material 21 and arranged therein. The holes are characterized by hole diameter 22 and hole interval 23. The recording layer base 16 can be produced by any of the following processes: formation of holes by anodic oxidation of aluminum (hereinafter referred to as a "anodic oxidation process"); and formation of holes by the use of a working object constituted of aluminum columns and surrounding material composed of silicon, germanium, or silicon-germanium, such as AlSi, AlGe, and AlSiGe (hereinafter referred to as a "column removal process") The processes are explained below in detail. A structure made of a block copolymer is also useful therefor.

Firstly, features of the recording layer base obtained by the anodic oxidation process are described.

An aluminum film is placed on substrate 10. The portion of the film where fine holes 20 are to be formed is immersed in aqueous solution of phosphoric acid, oxalic acid, sulfuric acid, or the like. A voltage is applied to the immersed film portion employing this portion as the anode, whereby holes are formed by self-organization. The intervals 23 between the formed holes depend on the applied voltage, in the known relation 2.5×(voltage (V)) nm. The minimum period of hole intervals 23 is about 10 nm, and the minimum the hole diameter 22 is about 8 nm.

By forming dents regularly on the surface of the aluminum film, holes can be formed regularly at the dent positions as the original points in a honeycomb state or a square state. This is a feature of the present invention, which provides a high possibility for the production of patterned media.

Specific examples of the structures having fine holes prepared by anodic oxidation of aluminum as described above are shown in Japanese Patent Application Laid-Open No. H11-200090.

Next, the recording layer base prepared by a column removal process is explained below. Si is used as an example of the base material, but Ge and SiGe are also useful.

A working object is provided in which Al columns stand straight in the direction perpendicular to the substrate, and an Si portion as base material 21 surrounds the columns. Si penetrates slightly into the Al portions and Al penetrates slightly into the Si portion. This working object is preferably formed by simultaneous film formation under a nonequilibrium state between Al and Si.

The working object is immersed into an acid, such as phosphoric acid, and sulfuric acid, or into an alkali, such as an aqueous ammonia solution, to dissolve and remove the Al columns. Otherwise, the Al columns can be removed by anode oxidation of the AlSi working object in an aqueous solution of sulfuric acid or the like. During the anodic oxidation, the Si portion is oxidized to $(Al_xSi_{1-x})_zO_{1-z}$, where $0<x\cdot0.2$, preferably $0<x\cdot0.1$. In the range of $0.334\cdot z\cdot1$, the portion is in an oxidation state. After the oxidation step, the recording layer base material also contains non-oxidized portions. The anodic oxidation is preferably stopped 30 to 60 seconds after the holes have reached underlayer 11, as shown in FIG. 2B, a sectional view at 2B-2B in FIG. 2A. Otherwise, the anodic oxidation may be stopped at the time when the anodic oxidation current has reached the minimum level. The oxidation may be conducted by annealing in an oxygen atmosphere.

The columnar Al is removed in such a manner to obtain a recording layer base. Depending on the composition of the base material portion, diameters 22 of the holes range preferably from 1 nm to 15 nm, and hole intervals 23 range preferably from 3 nm to 20 nm.

Specific examples of the aforementioned structure containing Si, Ge, or SiGe are described in Japanese Patent Application Laid-Open No. 2004-237431.

In the case where the magnetic material of the present invention is an L10 ordered alloy layer, the underlying electrode layer 11 preferably has a crystal arrangement in a square parallel to the substrate face in order to orient the c-axis in a direction perpendicular to the substrate. The (111) or (001) orientation of the crystal arrangement is preferably utilized: particularly the (001) orientation of the fcc structure is utilized. Specifically, for example, MgO having (001) orientation is inserted as the underlying electrode layer 11.

In the case where Al is used as substrate 10, an NiP film is preferably formed by plating or the like method as the underlying layer for obtaining the hardness.

A soft-magnetic underlayer is formed between substrate 10 and underlying electrode layer 11. The soft-magnetic film is mainly constituted of $Ni_tFe_{(1-t)}$, where t is in the range preferably from 0.65 to 0.91. The film may contain additionally Ag, Pd, Ir, Rh, Cu, Cr, P, B, or the like. The soft-magnetic underlayer, such as FeCo, FeTaC, and amorphous materials may be formed.

The surface of the recording layer of the magnetic recording medium is finely polished by the use of a diamond slurry or the like. The rms (root mean square: square root of the arithmetic means of the squares) of the projection-depression of the surface is not larger than 1 nm. The surface of the recording layer is preferably protected by protection layer 13. An effective protection layer is formed from a high-hardness non-magnetic material, such as carbon, carbides, and nitrides, for abrasion resistance against the friction with the head.

Lubrication layer 14 is preferably provided as the outermost layer of the magnetic recording medium. The lubrication layer is preferably formed by the application of PFPE (perfluoropolyether).

The filling of the magnetic material into the fine holes can be conducted by electro-deposition with an electrode placed at the bottom of the hole.

The filled magnetic material can be transformed into an L10 ordered alloy by annealing at a temperature not higher than 500° C.

The magnetic recording medium of the present invention is useful as a vertical magnetic recording medium.

EXAMPLES

The present invention is explained by reference to Examples.

Example 1

This Example describes the preparation of FePt plating solutions.

Plating Solution A was prepared, which contained 0.015 mol/L of hexachloroplatinate(IV) and 0.02 mol/L of iron chloride (i.e., hexachloroplatinate(IV): iron chloride (Pt:Fe)= 2:3). Thereto, 0.02 mol/L of ammonium tartrate was added as a complex agent, and further 0.1 mol/L of NaCl was added. The plating solution was kept at a temperature of 25° C. The pH of the plating solution was adjusted to pH 8 by the addition of sodium hydroxide to prepare Plating Solution A. For comparison, Plating Solution B was prepared by adjusting the pH to 3. Plating solution C was prepared by adjusting the pH to 11.

Plating Solution A was in a good state, being stable for a long time. On the other hand, Plating Solutions B and C were unstable, forming a precipitate after standing for a period of time.

Plating Solution D was prepared, which contained 0.01 mol/L of hexachloroplatinate(IV) and 0.01 mol/L of iron chloride (i.e., hexachloroplatinate(IV): iron chloride=1:1). Thereto, 0.01 mol/L of ammonium tartrate was added as a complex agent. The plating solution was kept at a temperature of 25° C. The pH of the plating solution was adjusted to pH 8 by the addition of sodium hydroxide to prepare Plating Solution D.

Plating Solution E was prepared, which contained 0.01 mol/L of hexachloroplatinate(IV) and 0.03 mol/L of iron chloride (i.e., hexachloroplatinate(IV): iron chloride=1:3). Thereto, 0.03 mol/L of ammonium tartrate was added as a complex agent. The plating solution was kept at a temperature of 30° C. The pH of the plating solution was adjusted to pH 8 by the addition of sodium hydroxide to prepare Plating Solution E.

Plating Solution F was prepared, which contained 0.01 mol/L of hexachloroplatinate(IV) and 0.05 mol/L of iron chloride (i.e., hexachloroplatinate(IV): iron chloride=1:5). Thereto, 0.05 mol/L of ammonium tartrate was added as a complex agent. The plating solution was kept at a temperature of 30° C. The pH of the plating solution was adjusted to pH 8 by the addition of sodium hydroxide to prepare Plating Solution F.

The above Plating Solutions D, E, and F contained, respectively, iron chloride and ammonium tartrate at the same concentration ratio, but contained hexachloroplatinate(IV) and iron chloride at different concentration ratios. Plating Solutions D and E were in a good state and stable for a long time, but Plating Solution F was unstable.

Plating Solution G was prepared, which contained 0.02 mol/L of hexachloroplatinate(IV) and 0.04 mol/L of iron chloride (i.e., hexachloroplatinate(IV): iron chloride=1:2). Thereto, 0.04 mol/L of ammonium tartrate was added as a complex agent. The plating solution was kept at a temperature of 25° C. The pH of the plating solution was adjusted to pH 8 by the addition of sodium hydroxide to prepare Plating Solution G.

Plating Solution H was prepared, which contained 0.02 mol/L of hexachloroplatinate(IV) and 0.05 mol/L of iron chloride (i.e., hexachloroplatinate(IV): iron chloride=1:2.5). Thereto, 0.05 mol/L of ammonium tartrate was added as a complex agent. The plating solution was kept at a temperature of 25° C. The pH of the plating solution was adjusted to pH 8 by the addition of sodium hydroxide to prepare Plating Solution H.

The above Plating Solutions G and H contained hexachloroplatinate(IV) at the same concentration of 0.02 mol/L. Plating Solutions G hand H were both in a good state, being stable for a long time.

A solution containing hexachloroplatinate(IV) and iron chloride at a molar ratio of 1:0.74 was prepared for the preparation of Plating Solution I. Another solution containing hexachloroplatinate(IV) and iron chloride at a molar ratio of 1:3.1 was prepared for the preparation of Plating Solution J. To the respective solutions, ammonium tartrate was added as a complex agent in an amount equimolar to the iron chloride. The solutions were kept at a temperature of 25° C. The pH levels of the solutions were adjusted, respectively, to pH 8 by the addition of sodium hydroxide to prepare Plating Solutions and J. Plating Solution I was stable for general use as a plating solution, but was not suitable for FePt Plating. Plating solution J was unstable.

For comparison, Plating Solutions A1 to G1 were prepared in the same manner as Plating Solutions A to G, except that ammonium tartrate was not added. Plating Solutions A1 to G1 were relatively unstable, causing precipitation during storage. In particular, the plating solutions of a high pH were highly instable.

For further comparison, Plating Solutions A2 to H2 were prepared in the same manner as Plating Solutions A to H, except that the pH of the respective solutions was adjusted to pH 4.9; and Plating Solutions A3 to H3 were prepared in the same manner as above, except that the pH of the respective solutions was adjusted to pH 10.6. These Plating solutions A2 to H2 and A3 to H3 were unstable and formed a precipitate during storage.

Plating Solution K was prepared, which contained 0.01 mol/L of hexachloroplatinate(IV) and 0.02 mol/L of iron chloride. Thereto, 0.02 mol/L of ammonium tartrate was added as a complex agent. The plating solution was kept at a temperature of 25° C. The pH of the plating solution was adjusted to pH 8 by the addition of sodium hydroxide to prepare Plating Solution K. This Plating Solution K was satisfactory. To fractions of Plating Solution K, NaCl was added at concentrations of 0.03, 0.10. and 0.12 mol/L, respectively. The addition of NaCl further improved the long-term stability as the plating solution.

Presumably, this improvement is caused by the suppression of a substitution reaction of chloride ions as ligands of the hexachloroplatinate(IV) with $H_2O$ as the solvent and OH due to the increased amount of the chloride ions.

Example 2

In this Example, an FePt magnetic material was produced from a stable FePt plating solution.

A plating solution of this Example was prepared by adding, to Plating Solution A prepared in Example 1, 0.03 mol/L of ammonium chloride as a buffering agent and 0.0001 mol/L of sodium dodecylsulfate as a surfactant. The above additives contribute to the stabilization of the pH of the plating bath during the plating and to the improvement of the plated film quality. The amount of the additives may be changed suitably corresponding to the uses.

An FePt magnetic material was prepared from the above plating solution. The working electrode employed was an Si substrate covered with a 50 nm thick Ag and Cu film formed by sputtering as an underlying electrode layer. The auxiliary electrode employed was a platinum plate. The reference electrode employed was Ag/AgCl. Plating was conducted at a potential of −1.5 V to obtain an FePt magnetic material having a composition of $Fe_{50}Pt_{50}$.

The formed FePt magnetic material film after annealing at 400° C. had a coercive force of 1000 Oe. Further annealing of the film at 450° C. increased the coercive force up to 4000 Oe or more. The greater coercive force is considered to be due to the higher ordered state of the FePt. The coercive force was measured by an AGM (Alternating Gradient Magnetometer).

The FePt magnetic film of the present invention having a composition of $Fe_{50}Pt_{50}$ formed on the Ag and Cu underlayer transformed into an L10 ordered alloy structure at a relatively low temperature of 450° C. and exhibited a coercive force of 4000 Oe or more.

With any of the stable plating solutions prepared in Example 1, except the one employed in Example 2, an FePt magnetic material having the composition of $Fe_{50}Pt_{50}$ can be produced, which can be transformed into L10 structure by annealing at 450° C. to exhibit the coercive force of 4000 Oe or more.

Example 3

In this Example, a recording medium was produced by the use of the magnetic material of the present invention.

On a glass substrate for a doughnut-shaped 2.5-inch HDD, there were formed, by sputtering, successively, an MgO film of 10 nm in a (001) orientation perpendicular to the substrate, an Ag film of 20 nm as an underlying electrode layer, and an AlSi structure of 30 nm formed from a sputtering target of $Al_{56}Si_{44}$. The AlSi structure employed in this Example was constituted characteristically of columnar aluminum portions and a surrounding Si portion.

The above film-coated substrate was immersed in an aqueous 2.8 wt. % ammonia solution at room temperature for 10 minutes to remove the aluminum portions from the AlSi structure to form fine holes. Thereby, at the bottom portions of the fine holes, the face of the Pt in (001) orientation state was bared. By the removal of the aluminum portions, the structure was obtained as shown in FIGS. 2A and 2B. In this Example, the diameter of the holes was 8 nm, and the interval between the holes was 10 nm.

The holes were filled with the magnetic material of the present invention as below. The plating solution therefore contained 0.015 mol/L of hexachloroplatinate(IV) salt, 0.02 mol/L of iron sulfate, 0.02 mol/L of ammonium tartrate and 0.1 mol/L of sodium chloride. The plating bath was kept at 30° C., and the pH of the solution was adjusted with sodium hydroxide to pH 8. Ammonium chloride was added thereto at a concentration of 0.03 mol/L as a buffering agent, and sodium dodecylsulfate was added at a concentration of 0.001 mol/L as a surfactant. Plating was conducted with this plating solution. The formed FePt magnetic material filling the holes was found to have a composition of $Fe_{50}Pt_{50}$ by analysis. The obtained magnetic material was annealed in a vacuum at 500° C. for 30 minutes to obtain an ordered alloy structure of the magnetic material.

The resulting FePt magnetic material filled in the holes had an L10 ordered alloy structure. The magnetic material had a coercive force of 4000 Oe in the direction perpendicular to the substrate. By observation of the structure, it was confirmed that the FePt magnetic material portions had a diameter of 8 nm with average intervals of 10 nm, and the magnetic material portions were partitioned by a nonmagnetic material mainly composed of Si.

Accordingly, the structure having a hard magnetic material dispersed uniformly was found to be suitable as a magnetic recording medium.

Example 4

In this Example, an FePt magnetic material having a composition of $Fe_{50}Pt_{50}$ was heat-treated in the presence of hydrogen at one atmospheric pressure at 350° C. to form an L10 ordered alloy structure to obtain a coercive force of 4000 Oe or more.

Firstly, a copper ammonium tartrate solution was prepared, which contained 0.001 mol/L of ammonium chloride and 0.002 mol/L of ammonium tartrate, and 0.002 mol/L of anhydrous copper sulfate was added thereto. Then, an FePt plating solution was prepared, which contained 0.014 mol/L of hexachloroplatinate(IV) salt, 0.02 mol/L of iron chloride, 0.02 mol/L of ammonium tartrate as a complex agent, and 0.1 mol/L of NaCl. To this FePt plating solution, there was added the above ammonium copper tartrate solution to prepare a Cu-containing FePt plating solution. The added Cu did not impair the plating solution stability. Incidentally, FePtCu plating solutions can be prepared by the use of any of the FePt plating solutions shown in Example 1.

An FePtCu alloy was prepared by plating with the above plating solution. The working electrode employed was an Si substrate covered with a 50 nm thick Ag and Cu film as an underlying electrode layer formed by sputtering. The auxiliary electrode was a platinum plate. The reference electrode was Ag/AgCl. Plating was conducted at a potential of −1.0 V to obtain an FePt alloy having a composition of $Fe_{45}Pt_{45}CU_{10}$.

The formed FePtCu magnetic material after the heat treatment at 400° C. had a coercive force of 4000 Oe or more. Further, the film annealed at 350° C. in the presence of hydrogen at one atmospheric pressure had a coercive force of not less than 5000 Oe. Thus, annealing at 300° C. in the presence of hydrogen increased the coercive force. The composition of the plated matter depends on the stirring rate, the pH of the plating solution, the temperature, and the applied voltage. With the FePtCu alloy, a greater coercive force can be obtained by forming an ordered alloy phase by a heat treatment at a temperature lower than that of the no-Cu-containing FePt alloy.

As shown in this Example, an FePtCu alloy composed of FePt as main components and Cu as a minor component can be produced by adding Cu to the FePt plating bath. In particular, a stable plating solution can be obtained by the addition of the Cu in a form of copper ammonium tartrate, and with this plating solution, an FePtCu alloy containing 25 at. % Cu can be produced. The Cu content of the FePtCu alloy can be changed by changing the concentration of the copper ammonium tartrate. At a Cu content in the alloy of higher than 25 at. %, the quality of the alloy film is significantly deteriorated, so that the concentration of the copper ammonium tartrate is preferably not higher than 0.05 mol/L. The Cu content in the FePtCu alloy depends also on the electrodeposition potential, the pH of the plating bath, the stirring rate, and other conditions.

The FePtCu alloy can be transformed, after film formation, into an L10 structure by heat treatment at 400° C. or higher to obtain a coercive force of more than 4000 Oe, and the coercive force can be further increased by a heat treatment in the presence of hydrogen at a temperature of higher than 300° C.

INDUSTRIAL APPLICABILITY

The present invention relates to a plating solution, a process for producing a structure by the use of the plating solution, and an apparatus for using the plating solution. A magnetic recording medium can be provided by the use of the plating solution.

This application claims priority from Japanese Patent Application Nos. 2004-009238, filed on Jan. 16, 2004, and 2004-271466, filed on Sep. 17, 2004, which are hereby incorporated by reference herein.

The invention claimed is:

1. A solution comprising ionic Fe supplied to the solution by an iron salt, ionic Pt supplied to the solution by a hexachloroplatinate(IV) salt, at a molar ratio of the ionic Fe to the ionic Pt ranging from 0.75 to 3, tartaric acid as a complexing agent, and chloride ion in an amount in excess of any chloride ion supplied to the solution by the iron salt and the hexachloroplatinate(IV) salt,
   wherein the solution is such that it is capable of depositing FePt or FePtCu when plating using the solution is performed,
   wherein a concentration of the ionic Fe is from 0.01 mol/L to 0.05 mol/L,
   wherein a pH of the solution is from 7.0 to 9.0, and
   wherein the chloride ion concentration is not lower than a molar concentration of the hexachloroplatinate(IV) salt.

2. The solution according to claim 1, wherein a double complex constituted of an Fe complex and a Pt complex is formed.

3. The solution according to claim 1, wherein the solution contains ionic Cu and a complex agent for the ionic Cu.

4. A process for producing a structure comprising steps of:
   providing an electrode and an object to be plated in a vessel containing a plating solution set forth in claim 1, and
   plating the object with a magnetic material containing FePt from the plating solution by applying voltage to the electrode to form a structure.

5. A process for producing a structure, wherein the structure formed in claim 4 is heat-treated further at a temperature ranging from 450° C. to 750° C.

6. A process for producing a structure, wherein the structure set forth in claim 4 is heat-treated further in the presence of hydrogen.

7. The process for producing a structure according to claim 4, wherein the object to be plated is a structure having holes, and the step of plating the object to form the structure is deposition of the magnetic material containing FePt into the holes.

8. An apparatus comprising a plating solution as set forth in claim 1, a vessel for holding the plating solution, and electrodes, for conducting plating by application of a voltage to the electrodes.

* * * * *